US005382794A

United States Patent [19]

Downey et al.

[11] Patent Number: 5,382,794

[45] Date of Patent: Jan. 17, 1995

[54] LASER INDUCED MASS SPECTROMETRY

[75] Inventors: Stephen W. Downey, Chatham; Adrian B. Emerson, Piscataway; Anthony M. Mujsce, Berkeley Heights; Amy J. Muller, Warren; William D. Reents, Jr., Middlesex; James D. Sinclair, Summit; Alka Swanson, New Providence, all of N.J.

[73] Assignee: AT&T Corp., Murray Hill, N.J.

[21] Appl. No.: 175,164

[22] Filed: Dec. 29, 1993

Related U.S. Application Data

[63] Continuation of Ser. No. 944,133, Sep. 11, 1992, abandoned.

[51] Int. Cl.$^{6}$ ......................... B01D 59/44; H01J 49/00

[52] U.S. Cl. ................................. 250/288; 250/423 P

[58] Field of Search ...................... 250/287, 288, 423 P

[56] References Cited

U.S. PATENT DOCUMENTS

| | | | |
|---|---|---|---|
| 4,383,171 | 5/1983 | Sinha et al. | 250/423 P |
| 4,686,366 | 8/1987 | Stuke | 250/423 P |
| 4,733,073 | 3/1988 | Becker et al. | 250/423 P |
| 4,855,594 | 8/1989 | Kimock et al. | 250/288 |
| 5,065,018 | 11/1991 | Bechtold et al. | 250/423 P |

OTHER PUBLICATIONS

"On-Line Single-Particle Analysis by Laser Desorption Mass Spectrometry" *Analytical Chemestry*, vol. 63, No. 18, (1991), pp. 2069-2073.

*Primary Examiner*—Bruce C. Anderson
*Attorney, Agent, or Firm*—Eileen D. Ferguson; Margaret A. Burke

[57] ABSTRACT

Disclosed is an apparatus which can serve to detect, count, size discriminate and analyze the chemical composition of particles in the air or process gases. In a preferred embodiment, the particles enter via a capillary into a differentially pumped chamber. A pulsed laser which is continuously fired is focused at an opening in the chamber. When the particles come into the path of the laser beam, the particles are fragmented and ionized. A dual time of flight mass spectrum is produced, recorded with an oscilloscope and analyzed with a computer. The mass spectrum information enables the determination of the chemical nature and concentration of the species of the particles, the particle size and the elemental composition of airborne particles in real time. Once these parameters are determined the source of the particles can be determined and eliminated from the environment and process. Thus, the inventive apparatus is advantageously used in conjunction with a facility, i.e., a semiconductor manufacturing facility, that requires ultra-clean conditions.

18 Claims, 5 Drawing Sheets

LASER INDUCED MASS SPECTROMETRY

This application is a continuation of U.S. patent application Ser. No. 07/944133, filed on Sep. 11, 1992, abandoned.

FIELD OF THE INVENTION

The present invention relates to laser mass spectrometry and more particularly to the analysis of airborne particles using a time of flight (TOF) mass spectrometer.

BACKGROUND OF THE INVENTION

Integrated circuits need to be produced in environments having a clean atmosphere. Significant failure rates in integrated circuits result when particles greater than one tenth the device linewidth are present. As device linewidths shrink, the tolerable particle size will also decrease. Currently 0.7 micron linewidths are common. In the future linewidths are expected to shrink to 0.1 micron or less. Removal of such small particles is extremely difficult as well as costly because the smaller the size of the particles the greater the number of particles that typically are present. There are a number of other situations in which the analysis of particles in the atmosphere would also be useful including monitoring of toxic dumps, spills of hazardous material, monitoring of automobile exhaust or smoke stacks, etc. Consequently control of a particle source is usually more cost effective than removing the particles once they are airborne. Thus means for identifying a potential particle source would be highly desirable.

Particle detection and analysis in clean rooms and gas distribution systems is typically done by real time, also known as on-line, counting of airborne particles with crude selectivity for size, followed by off-line analysis of particles deposited on wafers or other substrates by microscopic or laser scan techniques that provide size and elemental composition. Real time counting provides the rapid response required for monitoring a particle generation event. However, no information is provided to trace the particles to their source. Standard light scattering particle counters can only detect particles which are greater than several hundred angstroms in size. This lower size limit can be reduced by condensing a fluid on the particles. However, the available fluids are undesirable for use in clean rooms or in real time analysis. Off-line analysis can provide the tracking information, but there is no time correlation to note when a set of particles was generated. Off-line particle detection is also limited by particle size. Only particles greater than a tenth of a micron in diameter contain sufficient material for routine compositional analysis. Off-line analysis therefore only provides information about an ensemble of small particles.

Mass spectrometry is an analytical technique used for the accurate determination of molecular weights, the identification of chemical structures, the determination of the composition of mixtures and quantitative elemental analysis. For example, it is possible to determine the structure of molecules based on the fragmentation pattern of the ions formed when the molecule is ionized. An accurate elemental analysis of the molecules requires obtaining precise mass values from a high resolution mass spectrometer. Mass spectrometers operate in high vacuum, so analysis of atmospheric pressure gases requires that nearly all of the gas be pumped away from the analyte prior to ionization.

Real time or on-line particle analysis by mass spectrometry is normally accomplished by sampling particles through a differentially pumped nozzle and impacting the particle beam onto a heated surface. In surface ionization mode, however, ions are emitted and detected from the heated surface as well as from the sample particles, making it difficult to determine the composition and size of the particle. Additionally, not all elements of the sample will form ions, thus causing discrimination in the analysis. More universal detection can be performed by electron impact ionization of neutrals ejected by the particle-surface collision. This method, however, gives fairly extensive fragmentation and much lower ionization yields than surface ionization. Another problem associated with on-line analysis is that each particle yields a burst of ions on the time scale of tens of milliseconds or less. The transient nature of the signal makes it difficult or impossible to obtain a complete mass spectrum with scanning mass analyzers such as the quadrupole or magnetic sector. The consequences of using these analyzers are poor sensitivity and difficulty in performing multi component determinations.

These problems can be reduced by incorporating many features inherent to single-particle analysis by laser microprobe mass spectrometry. Unfortunately, the laser microprobe functions only in an off-line mode since the particle must be mounted on a solid substrate and the laser beam must be aligned to irradiate the particle.

On line particle analysis has been reported in "On-Line Single Particle Analysis by Laser Desorption Mass Spectrometry", Analytical Chemistry, Vol. 63, No. 18, Sep. 15, 1991, pages 2069–2073 which is incorporated here by reference. However, the reported apparatus had problems associated with detecting and analyzing the airborne particles. Additionally the ability to count and size discriminate the particles was not present thus the source of the particles could not be determined.

SUMMARY OF THE INVENTION

The present invention is a mobile particle analyzer which can serve to detect, count, size discriminate and analyze the chemical composition of particles suspended in air or other gases. Particle laden gas samples enter into the apparatus via an inlet device. The particle beam enters into a chamber having a pressure differential of approximately $10^6$. A pulsed laser having a power density of at least $1.5\times10^8$ W/cm$^2$ is focused near the outlet of the inlet device and continuously fired at a rate of approximately 10–100 Hz. As the particles pass through the laser beam, the particles are fragmented, atomized and ionized. A time of flight mass spectrometer detects and counts each fragmentation incident and measures the masses and yields of the ions. The count rate of each fragmentation incident along with the air flow through the inlet device determines the concentration of the particles in the air or process gases. The ion mass characterizes the chemical nature of the species contained in the particle and the ionic yield relates to the concentration of the species in the particle under analysis. The combined yield of all the ions is a measure of the particle size. This information is recorded e.g., with a digital oscilloscope. The digitized signal can then be analyzed and displayed e.g., with a computer. This analyzer enables real time simultaneous counting, size discrimination, and chemical analysis of the particles which are currently in the atmosphere or process gas.

Once the concentration and composition of the particles are determined as a function of size, then the source of the particles can be determined and removed from the environment and process.

BRIEF DESCRIPTION OF THE DRAWINGS

The advantages, nature and various additional features of the invention will appear more fully upon consideration of the illustrative embodiment now to be described in detail in connection with the accompanying drawings. In the drawings.

It is to be understood that these drawings are for purposes of illustrating the concepts of the invention and are not to scale.

DETAILED DESCRIPTION

Figure 1:
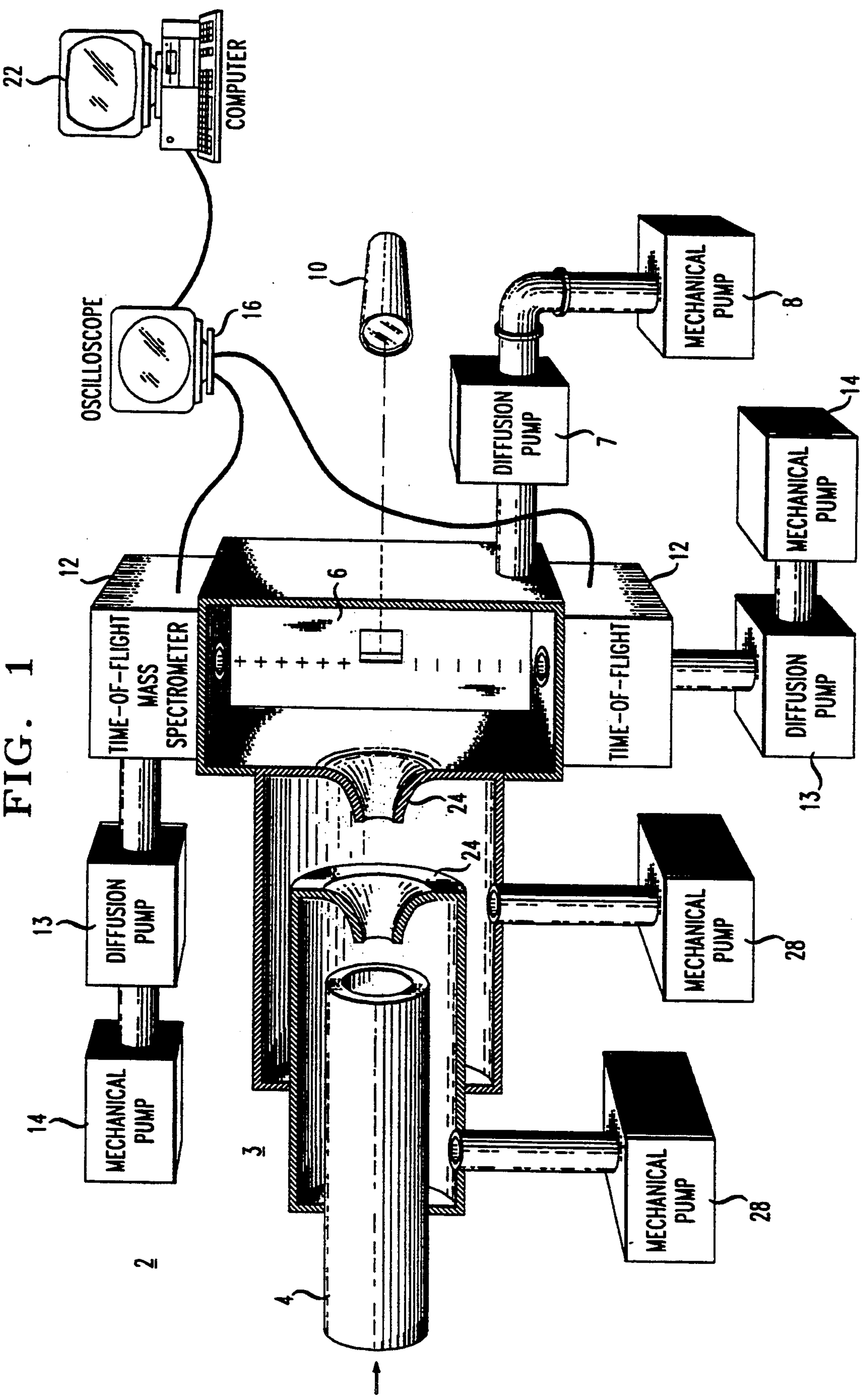
FIG. 1 is a cross sectional view of the particle analyzer with a capillary and pumped skimmer inlet in accordance with this invention.

Referring to FIG. 1, there is shown a mobile particle analyzer 2 which detects, counts, size discriminates, and analyzes the chemical composition of particles suspended in air or process gases in real time. The apparatus 2 is comprised of an inlet device 3 through which the particles pass and enter into a differentially pumped chamber 6. A pulsed laser 10 is focused at an opening in the chamber 6. The opening in the chamber 6 can either be in line with the path traveled by the particles or perpendicular to the path traveled by the particles. Upon particles entering the capillary 4 the pulsed laser 10 continuously fires. A time of flight mass spectrometer (TOF/MS) 12 obtains the mass spectra created when particles come in contact with the laser beam. A transient recorder such as a digital oscilloscope 16 records the mass spectra and a computer 22 analyzes and displays the information received from the oscilloscope 16.

Figure 2:
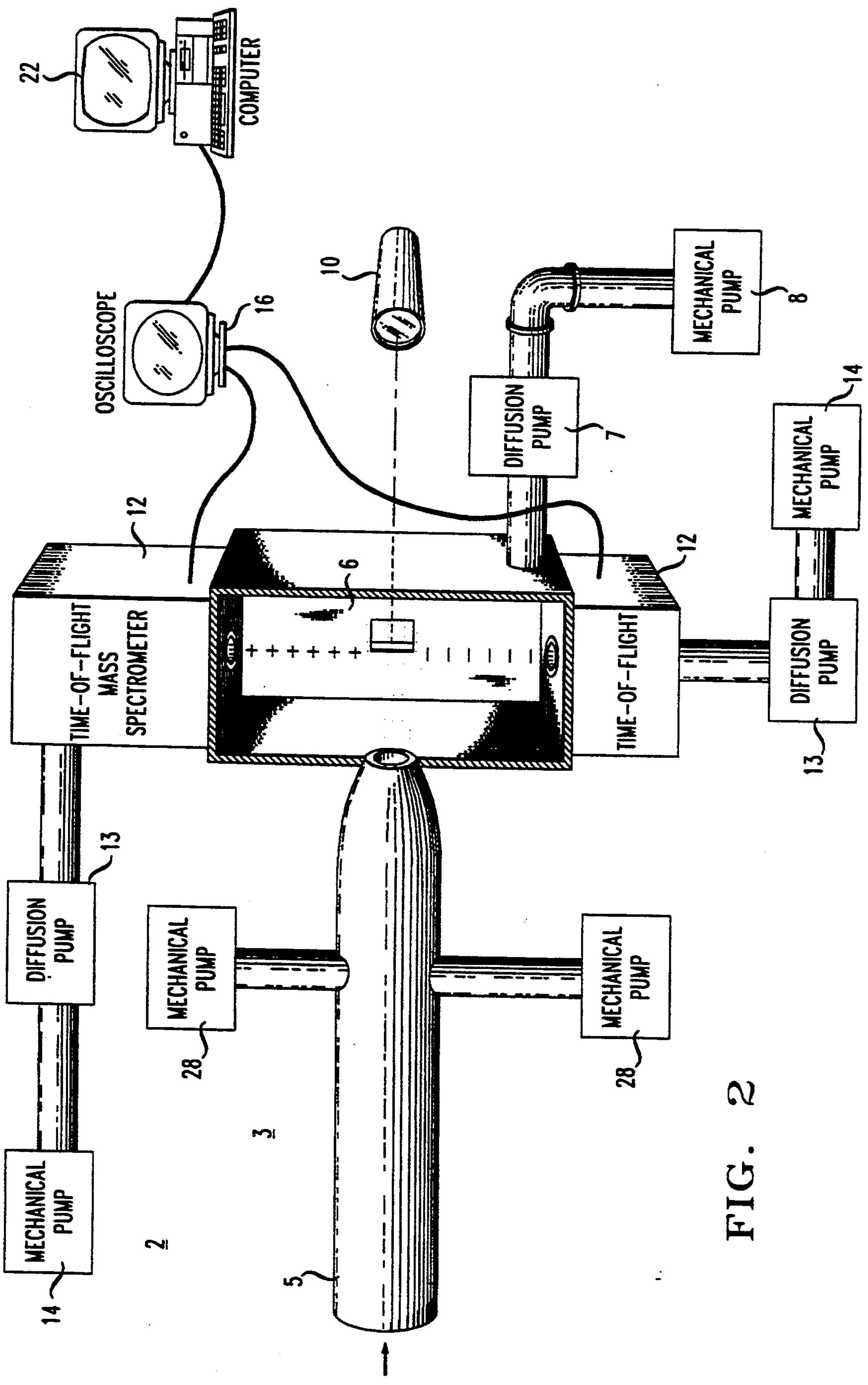
FIG. 2 is a cross sectional view of the particle analyzer with a jet separator capillary inlet in accordance with this invention.

A sample of gas enters into the apparatus 2 via an inlet device 3. The inlet device 3 can be a capillary 4, a capillary 4 with one or more pumped skimmers 24 positioned at the end of the capillary 4, or a pumped jet separator capillary 5, as shown in FIG. 2. The pressure in the skimmers 24 or the jet separator capillary 5 is kept at approximately 0.01–1 torr by mechanical pumps 28. Use of skimmers 24 or a jet separator capillary 5 assist in the focusing of the gas sample into the chamber 6. The inlet device 3 is made from any material which provides a smooth and even inside diameter such as fused silica. The diameter and length of the inlet device 3 varies depending on a number of factors including the pressure in the differentially pumped chamber 6 located at the outlet end of the inlet device 3. Typically the diameter of the inlet device 3 is 0.25–0.53 mm and is 50 cm long for particle sizes in the range of 0.01 to 1 micron and for a pressure in the chamber 6 of approximately $10^{-4}$ torr.

The chamber 6 is kept at a pressure of approximately $10^{-4}$ torr by a diffusion pump 7 and mechanical pump 8 of a type well known in the art. Reducing the diameter of the inlet device 3, positioning one or more skimmers 24 at the end of the capillary 4 or using a jet separator capillary 5 are all methods of reducing the pressure in the differentially pumped chamber 6. The pressure in the chamber 6 needs to be kept low to enable the particle beam to move through the inlet device 3 into the chamber 6 and for the TOF/MS 12 to operate.

A pulsed ionization laser 10 is focused on the particle beam after the beam leaves the inlet device 3. The optimum ionization laser 10 has a short pulse width, a high peak power, a moderate spot size and a high repetition rate. Each of these factors however are interrelated to each other and thus have corresponding effects on the other factors.

The laser pulse width affects the mass resolution and signal intensity. A short laser pulse width of approximately 10 ns narrows the ion generation pulse, thereby improving mass resolution and increasing the signal intensity. Increased signal intensity allows detection of smaller particles. Laser power of approximately 0.5 mJ or greater with a power density of greater than $1.5\times10^8$ W/cm$^2$ is required to initiate particle ablation and ionization. Lowering the laser power density to less than $1.5\times10^8$ W/cm$^2$ typically results in unusually small signals from the particles. At or above $1.5\times10^8$ W/cm$^2$ an ion signal from 1 to 3 volts is typically produced by particles of approximately one micron in size. Additionally, lowering the laser power, lowers the particle detection rate. At 160 mJ, detection rates of 1–2 particles per second were observed for an aspirated 10 mM $CsNO_3$ solution. For the same sample, at 30 mJ laser power, the detection rate was at or below 1 per 60 seconds. Lower laser power yields comparatively lower power density for the same laser spot size.

Smaller laser focal spot sizes produce greater peak power density but reduce the ionization volume and therefore the detection efficiency of particles. On the other hand, larger spot sizes require a higher energy laser to achieve threshold ionization power densities. For example, a laser 10 having a pulse frequency of approximately 30 Hz such as a Lambda Physik excimer laser has a focus spot size of approximately 2 mm$^2$. While a laser 10 with a pulse frequency of approximately 2,000 Hz such as a TFR Spectra Physics laser has a focus spot size of approximately 0.1 mm$^2$. A spot size of approximately 0.2 to 2 mm$^2$ is optimum.

High repetition rates allow for faster data collection for high particle count events. Unfortunately, high repetition rates result in lower laser power which reduces the detection rate. A laser having a frequency between 1–10 kHz is preferred, however a frequency between 10 to 100 Hz is acceptable.

Lasers which have the characteristics of a short pulse width, a high peak power density, a moderate spot size and a moderate repetition rate include an excimer laser. An example of such a laser is a Lambda Physik model EMG 202 excimer laser with a 40 ns pulse width, $2\times10^8$ W/cm$^2$ peak power, 2 mm$\times$0.5 mm spot size and 1–50 Hz repetition rate. As laser technology advances with respect to energy, frequency and pulse size, improvements in this method will be reflected.

A dual positive and negative time of flight mass spectrometer (TOF/MS) 12 such as a Jordon Associates Dual TOF/MS is positioned in line with the focal point of the laser 10. The spectrometer 12 counts each fragmentation incident and measures the masses and yields of both positive and negative ions produced when the particle beam comes in contact with the laser beam. The mass of the particles is dependent on the time it takes for the particle fragments to come into contact with the TOF/MS. The ionic yield is dependent on the charge given off by the fragmented particles. The signal intensity and mass resolution of the ionized particles are improved by using a reflectron (not shown) in the spectrometer 12. The addition of a reflectron (not shown) narrows the peaks giving a better mass measurement and the peak intensity increases improving the detection limits.

The output signal from the spectrometer 12 is recorded with a digital oscilloscope 16 such as a Tektronix 2440 or a Tektronix DSA 602. The digitized signal is analyzed and displayed with a computer 22 such as personal computer or a Macintosh. The computer takes the raw data and converts it into useable information relating to the chemical nature and concentration of the species in the particles, the chemical nature and concentration of the particles and the size of the particles. This information is then displayed in various formats.

The operation of the analyzer 2 begins with a particle laden gas sample passing through the inlet device 3 into the differentially pumped chamber 6. The pressure level in the chamber 6 affects a number of factors including the rate of particles entering into the chamber 6, the amount of particle dispersion which occurs when the particle beam leaves the inlet device 3 and how close the laser 10 is focused to the end of the inlet device 3.

Figure 3:
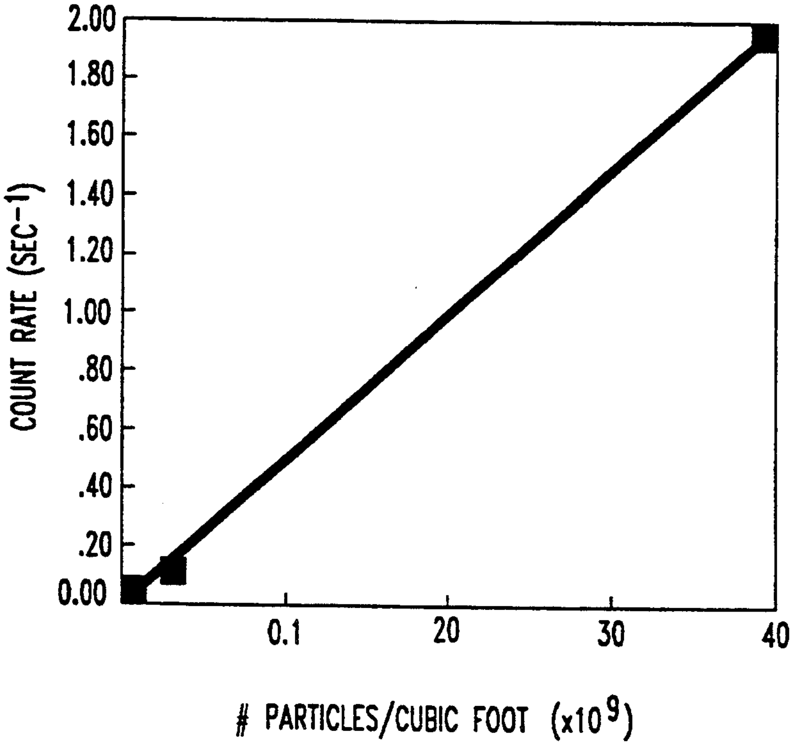
FIG. 3 shows the particle count rate to the number of particles per cubic foot.

Gas flow through the inlet device 3 into the chamber 6 is a factor which determines the rate of particle transport into the chamber and affects the particle detection rate. The gas flow through the inlet device 3 must be sufficient to enable the particles to enter into the chamber 6. Particles will not be transported and thus will not be detected if the gas flow is too low. The gas flow of a sample through the inlet device 3 is based on the diameter and length of the capillary 4 and the pressure in the chamber 6. An inlet device 3 having a diameter of 0.53 mm ID, a length of 50 cm and a differential pressure greater than seven hundred fifty in the chamber 6 has an air flow of approximately 8.1 $cm^3$/sec. Consequently a sample having a particle density of $10^6$ particles/$ft^3$ (1 $ft^3 = 2.8 \times 10^4$ $cm^3$) equates to a flux of 15,000 particles/min. The sample introduction rate is estimated at 150 particles/min. FIG. 3 shows the linear nature of the particles counted compared to the number of particles per cubic foot in the sample.

Figure 4:
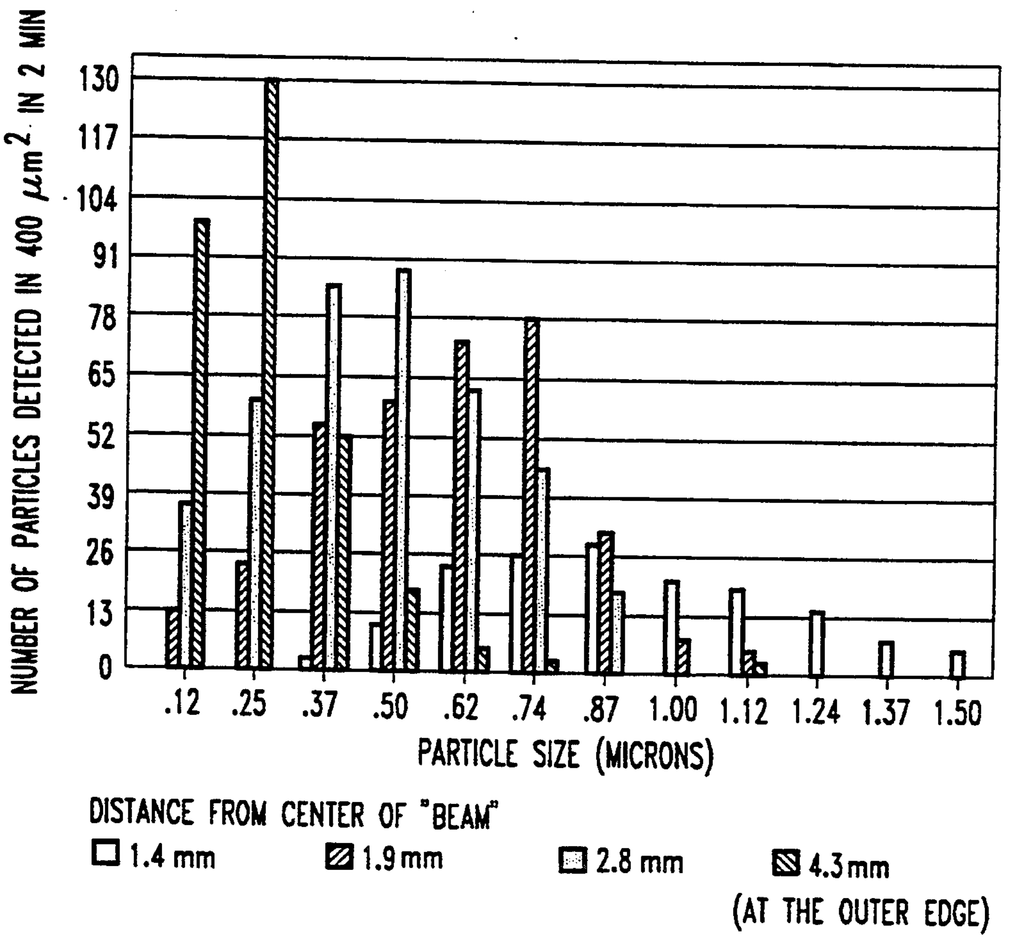
FIG. 4 is an illustration of particle dispersion comparing the particle size to the distance from the center of the particle beam.

After leaving the inlet device 3 and entering the chamber 6 the particle beam rapidly expands causing the particle density and thus the sensitivity to particles to decrease rapidly with distance from the outlet of the capillary. FIG. 4 shows the relative particle density as a function of particle size and radial distance from the capillary center at a distance of 4.5 cm from the inlet device 3. This figure clearly shows that smaller particles are more easily carried by the expanding gas to a larger radius; they dominate at the fringes of the beam ($\geqq$1.9 mm). On the other hand, large particles, greater than one micron, concentrate in the center of the particle beam ($\leqq$1.9 mm).

As a result of this pattern of dispersion, the size of the particles being detected can be pre-determined and selected. By focusing the laser 10 at the center of the particle beam, primarily larger particles are detected, whereas focusing the laser 10 at the fringes of the beam ($\geqq$1.9 mm) smaller particles are detected. Optimum particle detection requires focusing the laser 10 immediately or in close proximity to the outlet end of the inlet device 3 to minimize effects of dispersion of the particle beam. An alternative is also to have the laser 10 scan the dispersion range of the particle beam to obtain a full spectrum of particles. Because of the fact that the distance between the focal point of the laser 10 and the end of the inlet device 3 is less for a jet separator 5 compared to a capillary 4 and pumped skimmers 24 the detection of smaller particles for a jet separator 5 tends to be greater than for a capillary 4 and pumped skimmers 24.

Upon the introduction of a sample into the inlet device 3 the laser 10 is turned on and continuously fired. The power density of the laser is greater than $1.5 \times 10^8$ W/$cm^2$. Because the laser 10 is continuously firing there is no need for a second laser to detect the particle beam and trigger the firing laser. The laser 10 is focused at a point where the particle beam leaves the inlet device 3. As the particle beam leaves the inlet device 3 it passes through the laser beam which fragments, atomizes and ionizes the particles.

An ion signal or mass spectrum is produced when the particle beam comes in contact with the laser beam. The ion signal is detected and read by the spectrometer 12. The frequency of the fragmentation incidents determines the concentration of the particles in the gas sample. The ion masses characterize the chemical nature of the species contained in the particle. The ionic yield relates to the concentration of the species in the particle which was ionized. The combined yield of all the ions determines the size of the particle.

The ion signal produced by the particles is a function of laser power density and particle size with a threshold dependence. The laser power density should be at or above $1.5 \times 10^8$ W/$cm^2$ for ionization to occur. The ion signal produced by the particles is linear with the particle volume. FIG. 4 shows the linear ion signal for particles between 0.01–0.025 micron. Particles generated by atomizing a 0.2 to 10 mM $CsNO_3$ solution produced $Cs^+$ signals with an intensity of 1.5 to 3 volts. Particles generated from a 0.004 mM $CsNO_3$ solution gave weaker intensity $Cs^+$ signals, 0.04 to 0.4 volts. Thus if the laser power density is not sufficient enough only the surface of particles rather than the whole particle is ionized.

Figure 5:
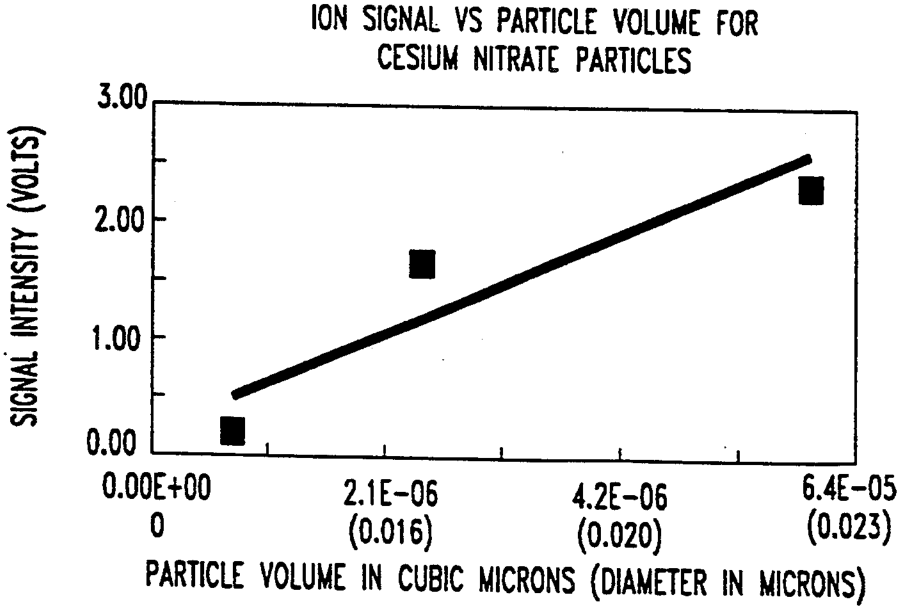
FIG. 5 shows the ion signal compared to the particle volume.
Figure 6:
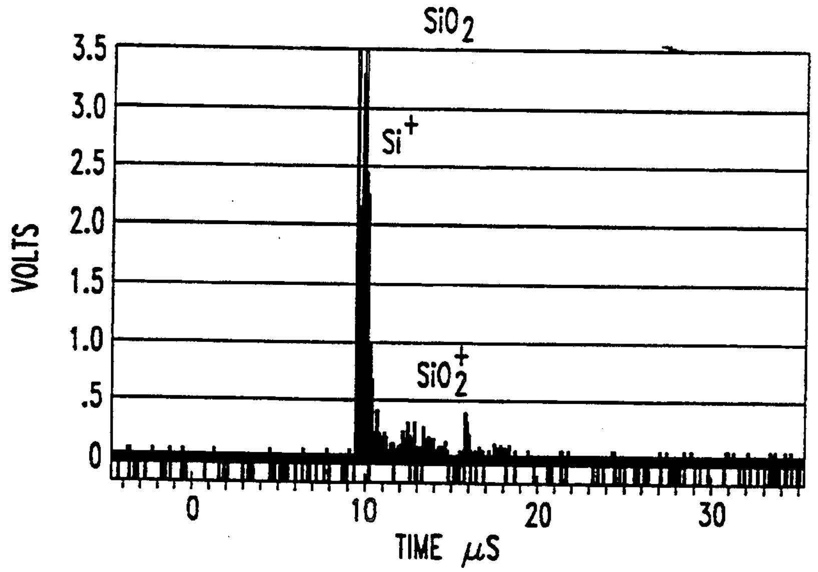
FIG. 6 shows the mass spectrum of a particle composed of $SIO_2$.
Figure 7:
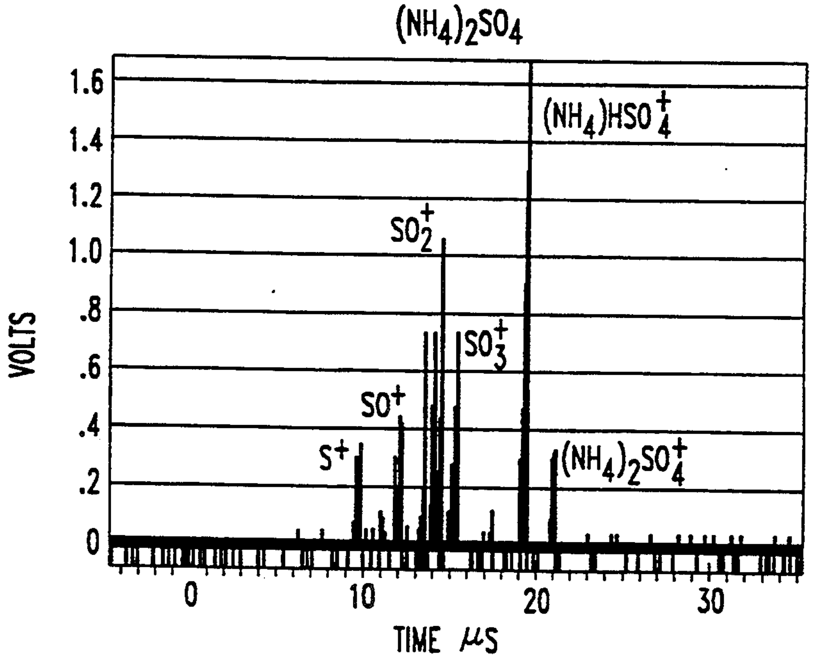
FIG. 7 shows the mass spectrum of a particle composed of $(NH_4)_2SO_4$.
Figure 8:
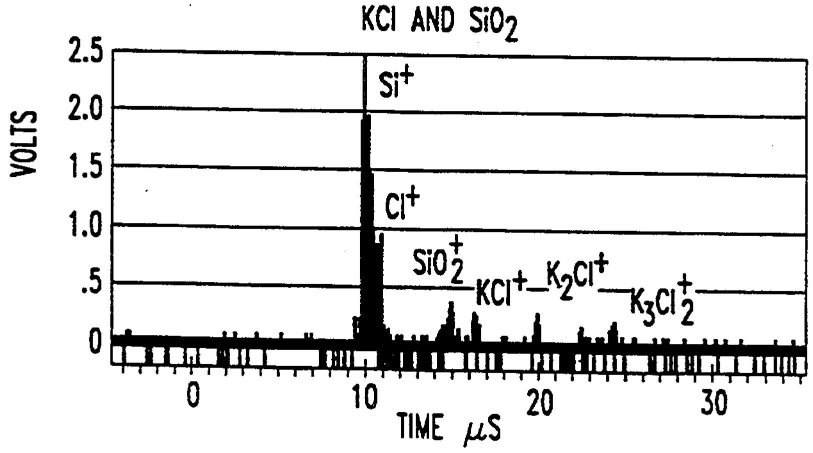
FIG. 8 shows the mass spectrum of particle composed of KCl and $SiO_2$.

For example, a synthetic dust sample having a composition of 66% Talc ($4SiO_2$—$3MgO$—$H_2O$),29%$(NH_4)_2SO_4$, 3%$(NH_4)HSO_4$, 1% KCL, and 1% $NaHCO_3$ was passed through the laser beam. The mass spectra produced by this sample are shown in FIGS. 6 through 8. Each spectrum is the signal produced as a result of four laser pulses. The ions observed in the mass spectrum show that the particles in the sample are not a homogeneous representation of the solid mixture. The identity of the particles were assigned based upon the mass spectra obtained when the particles were ionized. FIG. 6 shows silica without the magnesium present in talc; FIG. 7 is pure ammonium sulfate without the major constituent talc observed; and FIG. 8 shows a mixture of silica and potassium chloride. FIG. 8 results from the detection of two particles within one laser pulse or from two different pulses averaged together during the four laser pulse averaging time. There was a count rate of 1–2 particles per second detected. Consequently the concentration of the composition was $3\text{–}4\times10^{10}$ particles per cubic foot as is determinable from FIG. 3. From independent measurements the concentration of particles was determined to be approximately $5\times10^{10}$ particles per cubic foot. The size of the particles in the composition was determined as a result of the signal intensity which was produced when the particles were ionized. Referring to FIGS. 6–8 it is shown that the total ionic yield was approximately 7 V. By extrapolation of the data in FIG. 5 it was determined that the particles had a diameter of approximately 0.03 micron.

It is to be understood that the above described mobile particle analyzer is illustrative of only a few of many possible specific embodiments which can represent applications of the principles of the invention. Numerous and varied other arrangements such as replacing the oscilloscope with a gated integrator or time-gated ion counter or analyzing process gases instead of air particles can be readily devised in accordance with these principles by those skilled in the art without departing from the spirit and scope of the invention.

We claim:

1. An apparatus for simultaneously determining the size, number concentration and composition of particles spanning the size range of at least 0.01–1.0 micron in a gas stream, the apparatus comprising:

a) an evacuable chamber;

b) means for introducing particle laden gas into said chamber, said means comprising an inlet port;

c) laser means for fragmenting at least some of the particles in said gas, and for ionizing at least some of the fragments;

Characterized in That d) the laser means provides a laser beam comprising a sequence of pulses of width less than 50 ns;

e) said apparatus comprises a detector means to simultaneously (i) detect the number of ionized fragments thereby facilitating the determination of the particle size;

(ii) the mass and charge of the ionized fragments thereby facilitating the determination of the particle composition; and (iii) the frequency of fragmentation incidents thereby facilitating the determination of the particle concentration in the gas stream; and f) said apparatus comprises a means capable of bringing said beam to a focus at a point in close proximity to said inlet port along a path taken by said particles.

2. An apparatus according to claim 1 further comprising:

a) a means for determining the concentration of particles, in the gas stream as determined by the relationship between a laser pulse frequency and the frequency of pulses that result in the collection of ionized fragments originating from each particle, the size of particles as determined by the number of ionized fragments from each particle, and the composition of particles as determined by the mass and charge of fragments from each particle;

b) a means for recording the number of ionized fragments and the mass and charge of the ionized fragments from each particle; and c) a means for recording the number concentration of particles in the gas stream as determined by the relationship between laser pulse frequency and frequency of pulses from the collection of ionized fragments originating from each particle.

3. An apparatus for analyzing particles according to claim 2 wherein said means for recording is a transient recorder.

4. An apparatus for analyzing particles according to claim 1 further comprising a means for displaying the concentration, composition, mass and ionic charge information carried by the ionized fragments.

5. An apparatus according to claim 1 wherein said means for introducing particle laden gas into said chamber is an inlet device.

6. An apparatus for analyzing particles according to claim 5 wherein said inlet device is comprised of a capillary.

7. An apparatus for analyzing particles according to claim 6 further comprising orifices which are serially positioned with the outlet of said capillary.

8. An apparatus for analyzing particles according to claim 6 further comprising orifices which are located along the length of said capillary.

9. An apparatus for analyzing particles according to claim 6 wherein the outlet end of said capillary is tapered.

10. An apparatus for analyzing particles according to claim 5 wherein said chamber has a pressure differential such that said sample of particle laden gas can flow through said inlet device into said chamber.

11. An apparatus for analyzing particles according to claim 1 wherein said laser means has a power density of approximately $1.5\times10^{8}$ W/cm$^2$ or greater.

12. An apparatus for analyzing particles according to claim 1 wherein said detector means is a time of flight spectrometer.

13. An apparatus for analyzing particles according to claim 12 wherein said time of flight spectrometer comprises a reflectron.

14. An apparatus for analyzing particles according to claim 12 wherein said time of flight spectrometer detects both positive and negative ions.

15. An apparatus for analyzing particles according to claim 1 wherein said detector counts each fragmentation incident and measures the masses and number of the ions produced from said particles.

16. An apparatus for analyzing particles according to claim 1 wherein said means of step e) comprises a computer.

17. An apparatus for analyzing particles according to claim 1 wherein 2 the path along which the laser is focused varies in distance from an outlet of the inlet system.

18. An apparatus for analyzing particles according to claim 1 wherein the path along which the laser is focused varies across the width of the path taken bv the particles.

* * * * *